US010988179B2

(12) United States Patent
Tomizawa et al.

(10) Patent No.: US 10,988,179 B2
(45) Date of Patent: Apr. 27, 2021

(54) LOWER STRUCTURE OF VEHICLE

(71) Applicant: Toyota Jidosha Kabushiki Kaisha, Toyota (JP)

(72) Inventors: Yoshihito Tomizawa, Toyota (JP); Yoshinori Domon, Nagoya (JP); Akira Nishino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 16/508,693

(22) Filed: Jul. 11, 2019

(65) Prior Publication Data
US 2020/0017146 A1    Jan. 16, 2020

(30) Foreign Application Priority Data

Jul. 13, 2018    (JP) .............................. JP2018-133016

(51) Int. Cl.
| | | |
|---|---|---|
| *B62D 21/12* | (2006.01) | |
| *B62D 21/15* | (2006.01) | |
| *B60L 50/60* | (2019.01) | |
| *B62D 21/11* | (2006.01) | |

(52) U.S. Cl.
CPC ............ *B62D 21/155* (2013.01); *B60L 50/66* (2019.02); *B62D 21/11* (2013.01)

(58) Field of Classification Search
CPC ........ B62D 21/155; B62D 21/11; B60L 50/66
See application file for complete search history.

(56) References Cited

U.S. PATENT DOCUMENTS

| | | | |
|---|---|---|---|
| 2016/0016611 A1 | 1/2016 | Shirooka | |
| 2017/0120953 A1* | 5/2017 | Tomikuda | .............. B62D 21/11 |
| 2019/0023322 A1* | 1/2019 | Haselhorst | .............. B62D 21/11 |

FOREIGN PATENT DOCUMENTS

| | | |
|---|---|---|
| JP | 2006224877 A | 8/2006 |
| JP | 2012-214213 A | 11/2012 |
| JP | 2014-201283 A | 10/2014 |
| JP | 2017-197018 A | 11/2017 |
| WO | 2005118374 A1 | 12/2005 |

* cited by examiner

*Primary Examiner* — Lori L Lyjak
(74) *Attorney, Agent, or Firm* — Dinsmore & Shohl LLP (57) ABSTRACT

A suspension member is mounted on the side members of an underbody. On the rear portion of the suspension member, spacers are provided between the suspension member and the underbody. Each spacer includes a bracket. The front end surface of the bracket is opposed to the rear wall surface of a main suspension body. During a frontal collision, the rear wall surface of the suspension member abuts against the bracket, whereby retreat of the suspension member is reduced.

6 Claims, 5 Drawing Sheets

LOWER STRUCTURE OF VEHICLE

CROSS REFERENCE TO RELATED APPLICATION

This application claims priority to Japanese Patent Application No. 2018-133016 filed on Jul. 13, 2018 which is incorporated herein by reference in its entirety including the specification, claims, drawings, and abstract.

TECHNICAL FIELD

The present disclosure relates to the lower structure of a vehicle, and in particular, to control of the distance between components during a collision.

BACKGROUND

The lower structure of a vehicle includes an underbody and a suspension member mounted on the underbody, for operably supporting movable components of a suspension. Patent Document 1 below describes a suspension member (35) securely mounded on a front-side member (1). The rear end portion of the suspension member (35) is fixed to the front-side member (1) at a rear connection portion (37) via a separate component. Patent Document 1 also describes that an under-floor unit component (17) including a fuel cell stack (13) is mounted under the floor of the vehicle. Note that the reference numerals in the parentheses, or ( ), above are those used in Patent Document 1 mentioned below and are not related to the reference numerals used in the description of the embodiments of this specification.

CITATION LIST

Patent Literature

PATENT DOCUMENT 1: JP 2006-224877A

SUMMARY

During a frontal collision, such as a full-on or offset frontal collision, a front suspension member moves rearward relative to the underbody. There is room for improvement in reducing rearward movement of the front suspension member.

The present disclosure aims to reduce retreat, or a rearward movement, of a front suspension member relative to an underbody during a frontal collision.

According to one aspect of the present disclosure, there is provided a lower structure of a vehicle including an underbody including a framework member extending in the longitudinal direction of the vehicle; a front suspension member positioned below the front portion of the underbody and mounted on the framework member of the underbody; and a spacer provided between the underbody and the front suspension member. The spacer has a front end surface opposed to the rear wall surface of the front suspension member. During a frontal collision, the rear wall surface of the front suspension member abuts against the front end surface.

The spacer reduces retreat of the front suspension member during a frontal collision.

In one embodiment of the present disclosure, the spacer may have at least one bolt hole for penetration of a bolt for fixing the spacer to the framework member. The spacer may include an extending portion that extends forward of the vehicle from a portion where a bolt hole positioned foremost in the vehicle is defined. The front end surface of the extending portion is the front end surface of the spacer mentioned above that abuts against the rear wall surface of the front suspension member.

Provision of the extending portion enables determination of a position where the spacer abuts against the front suspension free from restriction imposed by the position where the spacer is fixed with a bolt.

In one embodiment of the present disclosure, the front suspension member may include tongue-like rear mounts extending rearward from the lower portion of the rear wall surface of the front suspension member and connected to the respective spacers. Each rear mount may have a weak structure between the portion connected to the spacer and the rear end surface.

When a collision force is applied to the front suspension member from the forward direction of the front suspension member, the rear mount having a weak structure will bend. This reduces the collision force to be transmitted to the spacer, and thus reduces retreat of the front suspension member and also retreat of the spacer.

In one embodiment of the present disclosure, the lower structure may include a battery mounted below the underbody and behind the front suspension member, the battery being for storing power for driving the vehicle. Since the spacer reduces retreat of the front suspension member during a frontal collision, the battery and the front suspension member can be kept spaced apart from each other.

In one embodiment of the present disclosure, a power line may be disposed between the front suspension member and the battery, the power line being connected to the battery. During a frontal collision, the spacer reduces retreat of the front suspension member whereby reducing the likelihood of the front suspension member to approach the power line.

BRIEF DESCRIPTION OF DRAWINGS

Embodiment(s) of the present disclosure will be described by reference to the following figures, wherein.

DESCRIPTION OF EMBODIMENTS

Embodiments of this disclosure will now be described by reference to the drawings. In the description below, terms indicating directions or orientations, such as front, forward, back, backward, left, right, side or lateral, up or above, upward, down, and downward, indicate those relative to a vehicle unless otherwise stated. The direction extending in the front-back direction of a vehicle will be referred to as a longitudinal direction, and the direction extending in the right and left direction is referred to as a lateral direction. In the respective drawings, an arrow FR indicates the forward direction; an arrow UP indicates the upward direction; and an arrow LH indicates the leftward direction.

Figure 1:
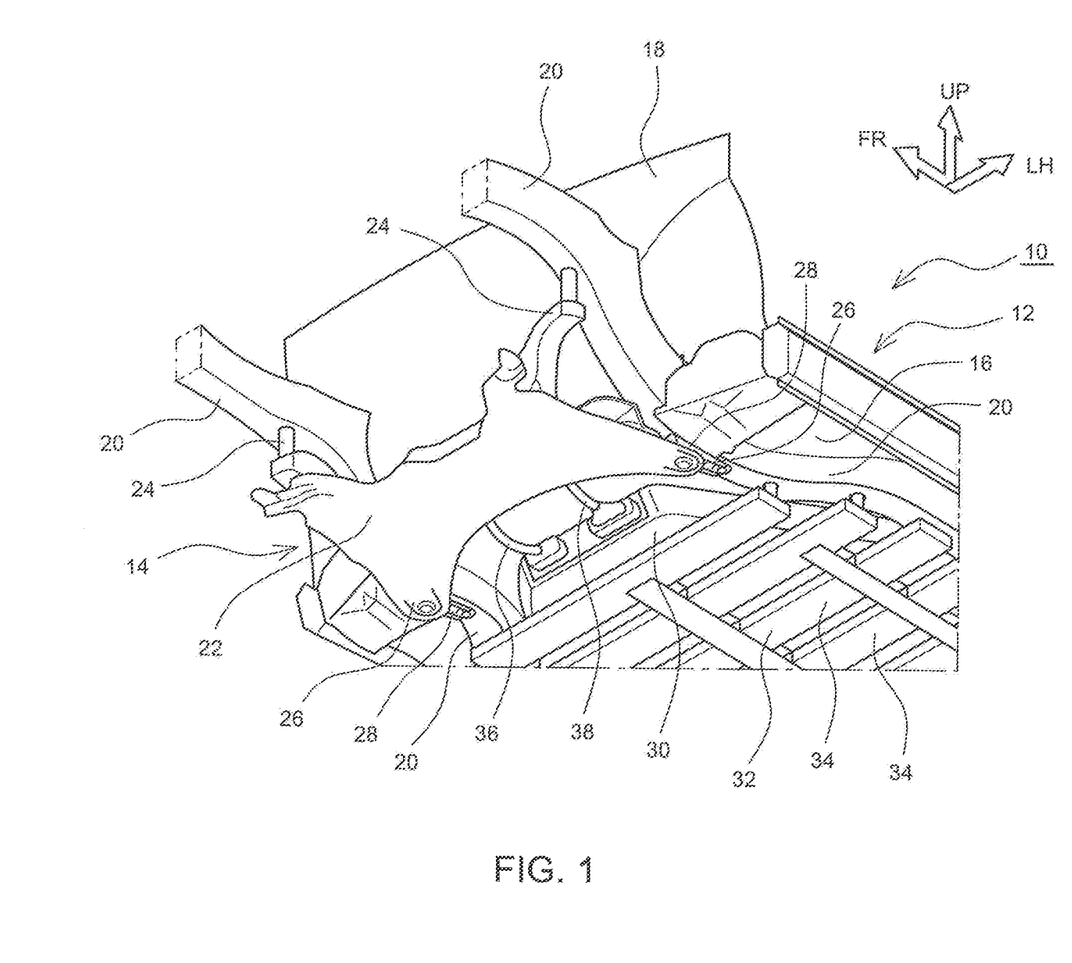
FIG. 1 is a schematic perspective view of the lower structure of a vehicle viewed upward from below.

FIG. 1 is a schematic view of a lower structure 10 of a vehicle; more particularly, a major part of the front portion of the lower structure 10 viewed upward from below. The lower structure 10 includes an underbody 12 and a front suspension member 14 (hereinafter referred to as a suspension member 14) positioned below the front portion of the underbody 12. The underbody 12 includes a floor 16 of a cabin, a dash panel 18 that defines the front end of the cabin, and a pair of right and left side members 20 extending in the longitudinal direction below the floor 16 and further in the forward direction. The dash panel 18 makes a partition for separating the cabin and a motor compartment positioned ahead of the cabin, for storing a motor, such as an electric motor. The right and left side members 20 bend inward below the floor 16 such that the respective front ends approach each other with the interval between right and left side members 20 becoming shorter as getting forward. A portion of each side member 20 more forward than the remaining portion below the floor 16 extends while curving upward along the dash panel 18 towards the forward end until a predetermined height where the portion then extends forward substantially horizontally inside the motor compartment. The pair of side members 20 function as framework members extending in the longitudinal direction on the respective right and left sides of the underbody 12. The suspension member 14 is made from a sheet metal by combining and attaching a plurality of parts formed in predetermined shapes. The suspension member 14 may be made from a different material using a different manufacturing method. For example, extruded or cast aluminum may be used.

The suspension member 14 is mounted on the side members 20, and constitutes a support point on the vehicle body side for movable parts of the suspension, such as lower arms. The suspension member 14 has a main suspension body 22. Support points for movable parts of the suspension are defined on the respective right and left end portions of the main suspension body 22. Mount arms 24 are disposed on the respective right and left sides of the front portion of the main suspension body 22. The respective upper ends of the mount arms 24 are connected to the side members 20 in the motor compartment. Further, tongue-like rear mounts 26 extending rearward are formed on the respective right and left sides of the rear portion of the main suspension body 22. The respective rear mounts 26 are connected to the side members 20 below the floor 16. Between the rear mounts 26 and the underbody 12, more particularly, the side members 20, spacers 28 are provided. Changing the dimensions of the mount arms 24 and the spacers 28 in the up-down direction enables changing the position of the suspension member 14 relative to the underbody 12 in the up-down direction.

A battery 30 is mounted below the floor 16. The battery 30 is supported from below by a gridded support frame 32 fixed to the right and left side members 20. The support frame 32 has a plurality of support beams 34 that extend in the lateral direction and whose ends are connected to the respective right and left side members 20. The battery 30 is fixed to the support beams 34. On the front end surface of the battery 30, a receptacle for connecting a power line 36 and a signal line 38 is mounted. The power line 36 supplies power stored in the battery 30 to a motor for driving a vehicle, and supplies power generated by a motor through regenerative braking to the battery 30. The signal line 38 sends detection signals indicating parameters on the conditions of the battery 30, such as the current, voltage, temperature, or the like, of the battery 30.

Figure 2:
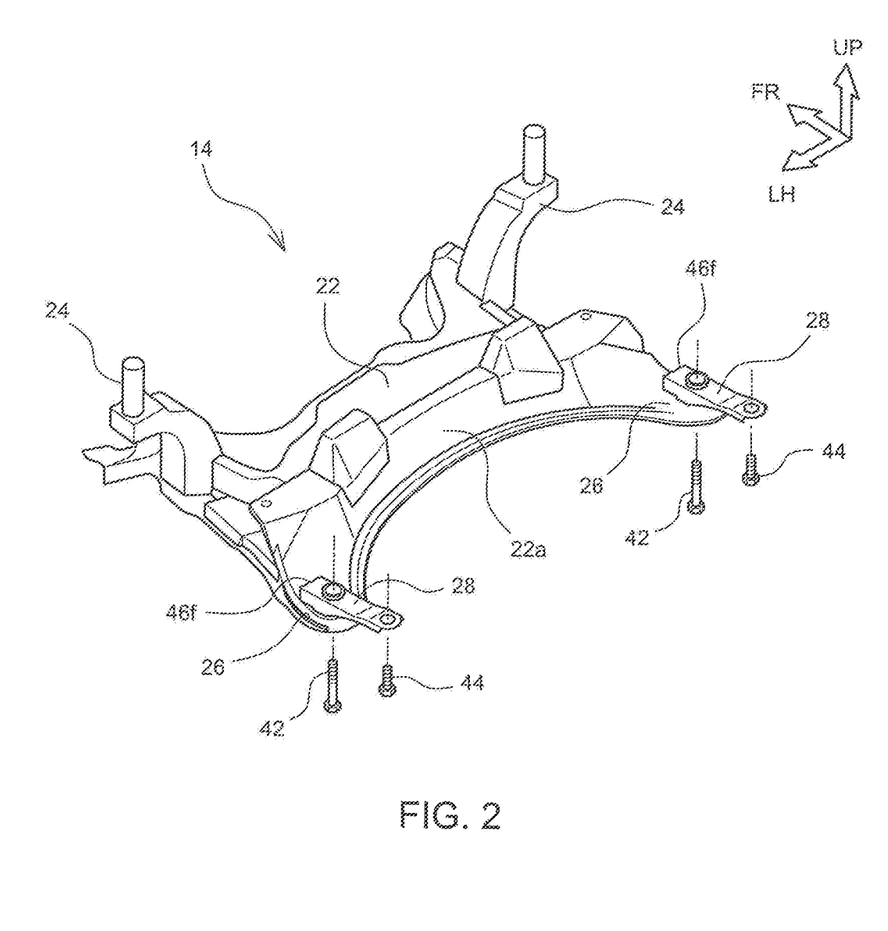
FIG. 2 is a schematic perspective view of a suspension member viewed downward.

FIG. 2 is a perspective view of the suspension member 14 with the spacers 28 mounted thereon. The main suspension body 22 has a rear wall surface 22a facing substantially rearward. The rear wall surface 22a is curved in the lateral direction. The curved rear wall surface 22a is disposed with the middle portion thereof positioned forward and both the end portions thereof rearward. The respective rear mounts 26 extend rearward from the lower portions of the both end portions of the rear wall surface 22a. The dimension (thickness) of each rear mount 26 in the up-down direction is shorter, as compared with the thickness of the main suspension body 22. On the upper surface of each rear mount 26, the spacer 28 is attached, for example, through welding. The suspension member 14 is mounted on the underbody 12 with the respective mount arms 24 connected to the side members 20 in the front portion of the suspension member 14 and the respective rear mounts 26 and the spacers 28 connected to the side members 20 in the rear portion of the suspension member 14. Each rear mount 26 is secured to the side member 20 with a bolt 42, which penetrates the rear mount 26 and the spacer 28, and with a bolt 44, which penetrates the spacer 28. The front-side bolt 42, together with the side member 20, sandwiches the rear mount 26 and a collar 48 to be described later.

Figure 3:
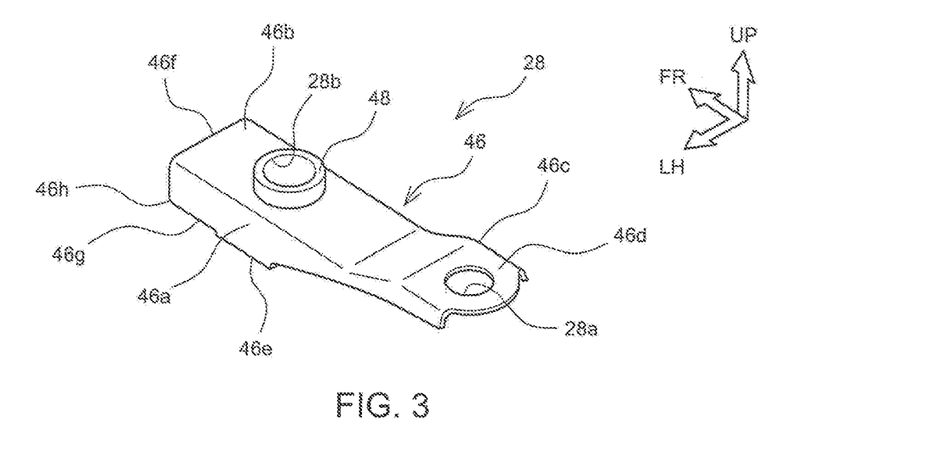
FIG. 3 is a perspective view of a spacer.
Figure 4:
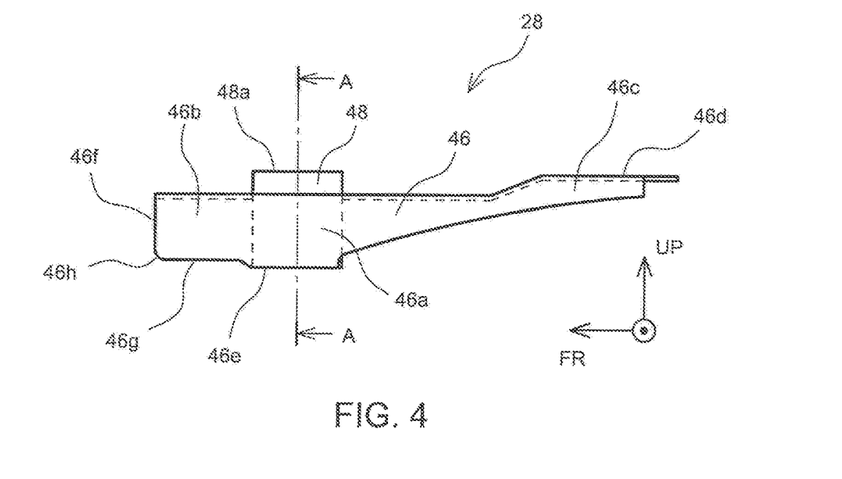
FIG. 4 is a side view of the spacer.
Figure 5:
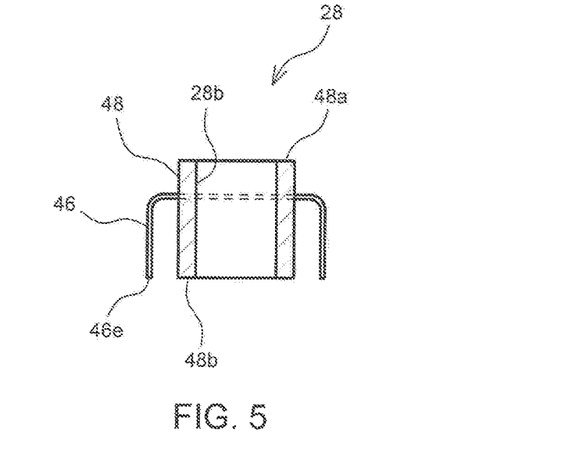
FIG. 5 is a cross-sectional view of the spacer along the line A-A in FIG. 4.

FIG. 3 to FIG. 5 illustrate the spacer 28. FIG. 3 is a perspective view; FIG. 4 is a side view; and FIG. 5 is a cross-sectional view along the line A-A in FIG. 4. The spacer 28 includes a bracket 46 extending in the longitudinal direction, and the collar 48 penetrating the bracket 46 in the up-down direction. The bracket 46 has an upside-down U-shaped cross section orthogonal to the longitudinal direction, and is made from a sheet metal. The bracket 46 is not limited to be made from a sheet metal. For example, extruded or cast aluminum may be used. At a position more forward than the middle of the bracket 46, the collar 48 penetrates the bracket 46 in the up-down direction. The portion of the bracket 46 penetrated by the collar 48 will be referred to as a penetrated collar portion 46a. The bracket 46 has an extending portion 46b that extends forward from the penetrated collar portion 46a. The collar 48 is a part subjected to the tightening force of the bolt 42. The portion of the bracket 46 extending more forward than the portion subjected to the tightening force corresponds to the extending portion 46b. The bracket 46 extends also rearward from the penetrated collar portion 46a. A through hole is formed on the rear end portion 46c of the rearwardly extending portion. The throughout hole corresponds to a rear bolt hole 28a of the spacer 28 through which the bolt 44 is to penetrate.

Figure 6:
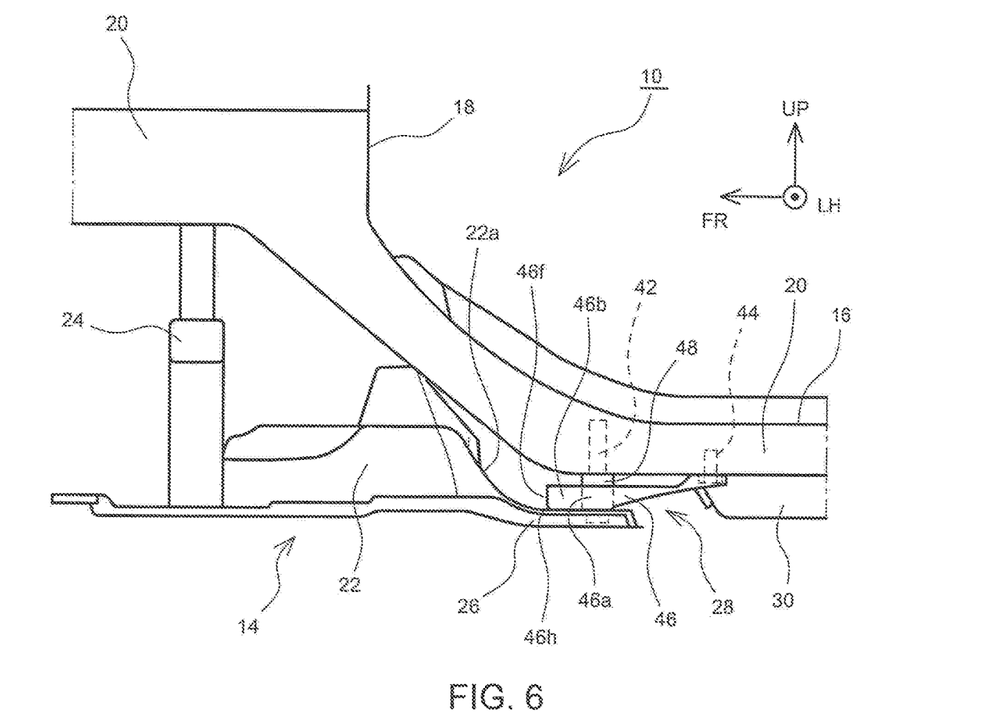
FIG. 6 is a schematic side view showing a relationship between the suspension member and the spacer.

A front end surface 46f of the bracket 46 (the front end surface of the extending portion 46b) is opposed to the rear wall surface 22a of the main suspension body 22 (refer to FIG. 2 and FIG. 6). The bracket 46 is a part of the spacer 28, and the front end surface 46f of the bracket 46 is also the front end surface of the spacer 28.

The collar 48 has a column shape, whose upper end surface 48a is positioned at the same height as the upper surface 46d of the rear end portion 46c of the bracket, and whose lower end surface 48b is positioned at the same height as the lower edge 46e of the penetrated collar portion 46a of the bracket. The collar 48 is attached to the bracket 46 through welding, for example. Specifically, the side surface of the collar 48 is welded to the upper surface of the penetrated collar portion 46a of the bracket. The collar 48 constitutes the front bolt hole 28b of the spacer, through which the bolt 42 is to penetrate. The upper end surface 48*a* and the upper surface 46*d* of the rear end portion 46*c* of the bracket may have different heights to fit the shape of the surface to which the spacer 28 is attached.

The spacer 28 is attached by welding the lower edge 46*e* of the penetrated collar portion 46*a* of the bracket to the rear mount 26 of the suspension member 14. Meanwhile, the lower edge 46*g* of the extending portion 46*b* is not welded to the rear mount 26.

A corner 46*h* defined by the front end surface 46*f* and the lower edge 46*g* of the bracket 46 is chamfered; in particular, round-chamfered. The front end surface 46*f* of the bracket has an upside-down U-shape, with the corner 46*h* of the lower end portion of each of the two parallel portions of the U-shaped portion being round-chamfered.

Figure 7:
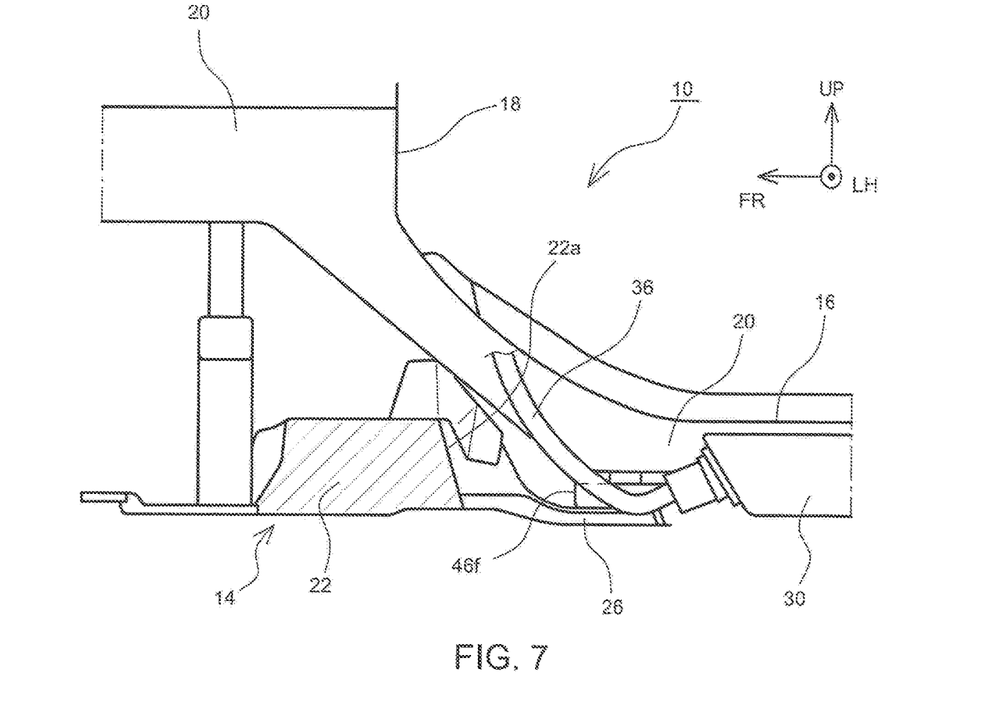
FIG. 7 is a schematic side view showing a relationship between the suspension member and a power line.

FIG. 6 and FIG. 7 are schematic side views of a structure of the suspension member 14; in particular, around the rear mount 26. In particular, FIG. 6 illustrates the positional relationship between the suspension member 14 and the spacer 28; and FIG. 7 illustrates the positional relationship between the suspension member 14 and the power line 36. In FIG. 7, the inside structure of the main suspension body 22 is not illustrated.

As well illustrated in FIG. 6, the thickness of the rear mount 26 is smaller, as compared with that of the main suspension body 22, and the thickness of the suspension member 14 becomes suddenly and remarkably reduced toward the rearward direction in an area near the rear wall surface 22*a*. As well illustrated in FIG. 2, in the lateral direction as well, the lateral dimension (width) of the rear mount 26 is smaller, as compared with the main suspension body 22, and becomes remarkably and suddenly reduced. Such a portion whose thickness reduces suddenly and remarkably is weak and thus will start deforming earlier than other portions upon receipt of a force during a collision. That is, the root of the rear mount 26 and its surrounding portion are weak portions that will start deforming earlier than other portions.

The spacer 28 is provided between the suspension member 14 and the side member 20, and defines the position of the suspension member 14 in the up-down direction relative to the underbody 12. The position of the suspension member 14 in the up-down direction can be changed depending on whether the spacer 28 is present or by changing the thickness of the spacer 28. The spacer 28 is fixed to the side member 20 at two points in the longitudinal direction. Specifically, the spacer 28 is attached to the side member 20 together with the suspension member 14 with the bolt 42 on the front side, and also to the side member 20 with the bolt 44 on the rear side. The extending portion 46*b* of the bracket of the spacer 28 extends forward from the position where the spacer 28 is fixed with the bolt 42 such that the front end surface 46*f* of the extending portion 46*b* is opposed to the rear wall surface 22*a* of the suspension member 14. The extending portion 46*b* of the bracket will abut against the rear wall surface 22*a* of the suspension member 14, which will retreat, or move backward, during a full-on frontal collision or an offset frontal collision. Changing the length of the extending portion 46*b* enables changing the position where the extending portion 46*b* abuts against the suspension member 14. This enables controlling the amount of retreat of the suspension member 14.

Since the rear wall surface 22*a* of the main suspension body 22 is curved, a portion of the rear wall surface 22*a* opposed to the power line 36 is positioned more forward than a portion of the rear wall surface 22*a* opposed to the spacer 28, as illustrated in FIG. 7.

Figure 8:
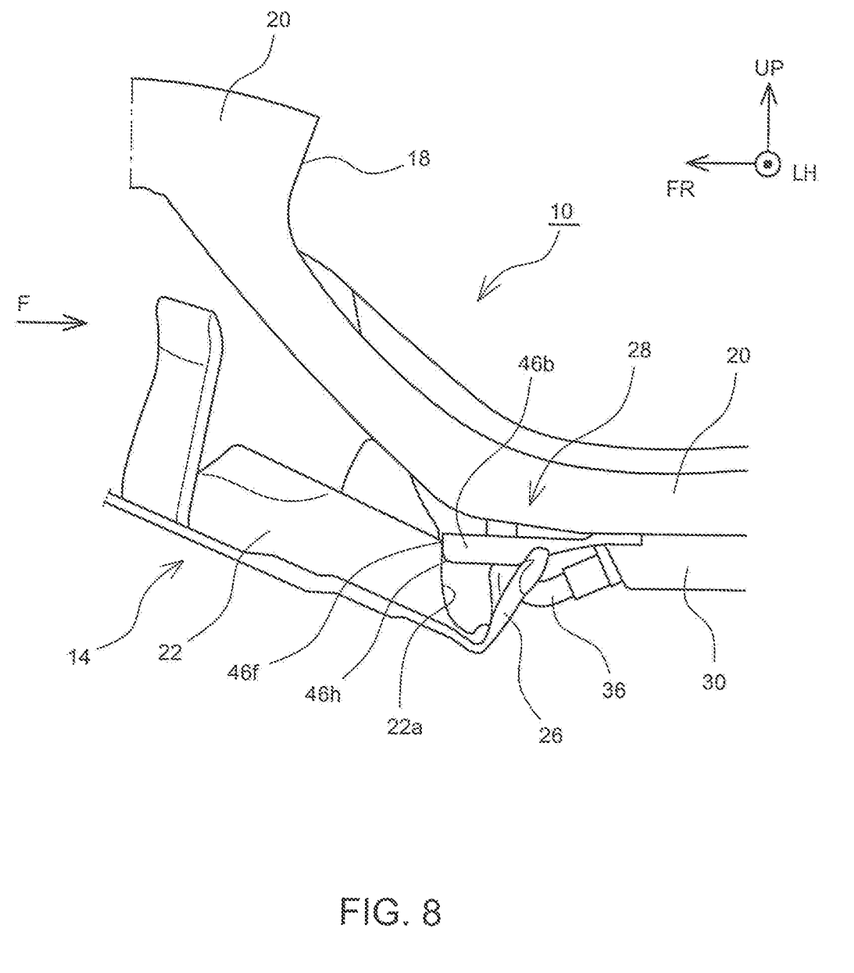
FIG. 8 is a schematic side view of a lower structure that is deforming during a frontal collision.

FIG. 8 illustrates the lower structure 10 that is deforming during a frontal collision under a predetermined condition. Assume that the condition at a frontal collision can be, for example, the same as the condition in a predetermined full-on frontal collision test or offset frontal collision test. For example, in a full-on frontal collision test, a vehicle is brought into frontal collision against a wall surface at the speed of 55 km/h. In an offset frontal collision, a vehicle is brought into collision against an object having a predetermined structure with the overlap rate of 40% at 64 km/h.

While the cabin of a vehicle has a rigid structure to protect an occupant, the portion more forward than the cabin has a structure that is relatively readily deformable in order to absorb the energy during a collision. When the lower structure 10 receives a collision force F during a frontal collision, the front portion of the lower structure 10 deforms. Accordingly, the suspension member 14 retreats. Meanwhile, since the spacer 28 is fixed to a rigid portion under the floor of the side member 20, the rear mounts 26 of the suspension member 14 will not be largely displaced. Consequently, the weak portion of the rear mounts 26 will bend. As illustrated in FIG. 8, the rear mount 26 bends into a V-shape, upon which the rear wall surface 22*a* of the main suspension body is caused to abut against the front end surface 46*f* of the bracket. With the above, retreat of the suspension member 14 is reduced. Consequently, deformation of the underbody 12, such as the floor 16, caused by the suspension member 14 can be reduced. Further, as the retreat of the suspension member 14 is reduced, the likelihood of the suspension member 14 to crash into the battery 30 can be reduced. Also, it is possible to reduce the likelihood of the power line 36 to be inserted into the space between the suspension member 14 and the underbody 12.

Desirable setting of the length of the extending portion 46*b* of the bracket enables controlling the position where the suspension member 14 will abut against the bracket 46 and the retreat amount of the suspension member 14.

During a frontal collision, since the rear mount 26 deforms at earlier timing, the likelihood of the deformation or removal of the spacer 28 earlier than the rear mount 26 can be reduced. This can enhance the reliability in receiving the retreating suspension member 14. Since the extending portion 46*b* of the bracket is not attached to the rear mounts 26, the rear mount 26 can freely bend into a V-shape. Further, the extending portion 46*b* does not receive a force due to deformation of the rear mounts 26. This makes it possible to reduce deformation of the extending portion 46*b*, so that the extending portion 46*b* can be held opposed to the rear wall surface 22*a* of the main suspension body.

Chamfering a part of the peripheral edge of the front end surface 46*f* of the bracket enables reducing the likelihood of the bracket 46 to stick into the rear wall surface 22*a* of the main suspension body. If the bracket 46 sticks, the bracket 46 will not be able to sufficiently support the retreating suspension member 14, thereby weakening the effect of reducing the retreating movement. As the front end surface 46*f* is chamfered, the likelihood of the bracket 46 to stick into the rear wall surface 22*a* can be reduced, and the retreat of the suspension member 14 can be efficiently reduced. Further, if the bracket 46 sticks into the rear wall surface 22*a*, the suspension member 14 will be blocked from moving downward. Consequently, the collision force will not be released, so as not to be transmitted to the underbody 12. Chamfering the front end surface 46*f* enables releasing the collision force, so that the collision force will not be transmitted to the underbody 12 and the battery 30.

The structure of the spacer is not limited to a structure constituted of two components; namely, the bracket 46 and the collar 48, but can be made from a single component. The shape of the front end surface of the spacer is not limited to a U-shape, but can be, for example, a solid quadrilateral or a quadrilateral frame shape. The whole peripheral edge of the front end surface may be chamfered, or only a part of the peripheral edge may be chamfered. Alternatively, only a corner may be chamfered.

Another aspect of the present disclosure will be described below.

(1) A lower structure of a vehicle includes an underbody including a framework member extending in the longitudinal direction of the vehicle; a front suspension member positioned below the front portion of the underbody and mounted on the framework member of the underbody; and a spacer provided between the underbody and the front suspension member and having at least one bolt hole for penetration of a bolt for fixing to the framework member. The spacer includes an extending portion extending forward of the vehicle from a portion where a foremost bolt hole in the vehicle is defined. The front end surface of the extending portion is opposed to the rear wall surface of the front suspension member.

REFERENCE SIGNS LIST

10 lower structure, 12 underbody, 14 (front) suspension member, 16 floor, 18 dash panel, 20 side member (framework member), 22 main suspension body, 22a rear wall surface, 24 mount arm, 26 rear mount, 28 spacer, 28a rear bolt hole, 28b front bolt hole, 30 battery, 32 support frame, 34 support beam, 36 power line, 38 signal line, 42, 44 bolt, 46 bracket, 46a penetrated collar portion, 46b extending portion, 46e lower edge of the penetrated collar portion, 46f front end surface, 46g lower edge, 46h (round-chamfered) corner, 48 collar.

The invention claimed is:

1. A lower structure of a vehicle, comprising:
    an underbody including a framework member extending in a longitudinal direction of the vehicle;
    a front suspension member positioned below a front portion of the underbody and mounted on the framework member of the underbody; and
    a spacer provided between the underbody and the front suspension member and having a front end surface opposed to a rear wall surface of the front suspension member, wherein the rear wall surface of the front suspension member abuts against the front end surface during a frontal collision.

2. The lower structure of a vehicle according to claim 1, wherein
    the spacer has at least one bolt hole for penetration of a bolt for fixing the spacer to the framework member, and
    the spacer includes an extending portion extending forward of the vehicle from a portion where a bolt hole positioned foremost in the vehicle is defined, the extending portion having a front end surface that is the front end surface of the spacer.

3. The lower structure of a vehicle according to claim 1, wherein
    the front suspension member includes a tongue-like rear mounts each extending rearward from a lower portion of the rear wall surface and connected to the spacer, the rear mount having a weak structure between a portion of the rear mount that is connected to the spacer and the rear wall surface.

4. The lower structure of a vehicle according to claim 1, further comprising a battery mounted below the underbody and behind the front suspension member, for storing power for driving the vehicle.

5. The lower structure of a vehicle according to claim 4, further comprising a power line connected to the battery and disposed between the front suspension member and the battery,
    wherein
    during a frontal collision, the spacer reduces retreat of the front suspension member, whereby reducing likelihood of the front suspension member to approach the power line.

6. A lower structure of a vehicle, comprising:
    an underbody including a framework member extending in a longitudinal direction of the vehicle;
    a front suspension member positioned below a front portion of the underbody and mounted on the framework member of the underbody; and
    a spacer provided between the underbody and the front suspension member and having at least one bolt hole for penetration of a bolt for fixing to the framework member, the spacer including an extending portion, the extending portion extending forward of the vehicle from a portion where a bolt hole positioned foremost in the vehicle is defined, and the extending portion having a front end surface that is opposed to the rear wall surface of the front suspension member.

\* \* \* \* \*

UNITED STATES PATENT AND TRADEMARK OFFICE
CERTIFICATE OF CORRECTION

PATENT NO. : 10,988,179 B2
APPLICATION NO. : 16/508693
DATED : April 27, 2021
INVENTOR(S) : Yoshihito Tomizawa, Yoshinori Domon and Akira Nishino It is certified that error appears in the above-identified patent and that said Letters Patent is hereby corrected as shown below:

In the Specification

In Column 2, Line(s) 50, after "spacer", delete "," and insert --;--, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*